United States Patent
Zabatani et al.

(10) Patent No.: US 9,800,795 B2
(45) Date of Patent: Oct. 24, 2017

(54) AUTO RANGE CONTROL FOR ACTIVE ILLUMINATION DEPTH CAMERA

(71) Applicant: Intel Corporation, Santa Clara, CA (US)

(72) Inventors: Aviad Zabatani, Even Yehuda (IL); Erez Sperling, D.N. Menashe (IL); Ofir Mulla, Petach Tikva (IL); Ron Kimmel, Haifa (IL); Alex Bronstein, Haifa (IL); Michael Bronstein, Lugano (CH); David H. Silver, Haifa (IL); Ohad Menashe, Haifa (IL); Vitaly Surazhsky, Yokneam Illit (IL)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/977,140

(22) Filed: Dec. 21, 2015

(65) Prior Publication Data

US 2017/0180622 A1  Jun. 22, 2017

(51) Int. Cl.
*H04N 5/235* (2006.01)
*H04N 5/225* (2006.01)

(52) U.S. Cl.
CPC ......... *H04N 5/2355* (2013.01); *H04N 5/2256* (2013.01); *H04N 5/2353* (2013.01); *H04N 5/2354* (2013.01)

(58) Field of Classification Search
CPC .. H04N 5/2355; H04N 5/2256; H04N 5/2353; H04N 5/2354; G01B 11/22
See application file for complete search history.

(56) References Cited

U.S. PATENT DOCUMENTS

| 6,965,690 | B2* | 11/2005 | Matsumoto | G06T 17/10 345/420 |
| 7,092,563 | B2* | 8/2006 | Shiratani | G01B 11/25 345/419 |
| 8,224,064 | B1* | 7/2012 | Hassebrook | G01B 11/2513 345/585 |
| 8,670,037 | B2* | 3/2014 | Arnon | A61B 5/015 348/162 |

(Continued)

FOREIGN PATENT DOCUMENTS

JP  2012134670  7/2012

OTHER PUBLICATIONS

Notification of Transmittal of the International Search Report and the Written Opinion of the International Searching Authority issued for International Patent Application No. PCT/US2016/058475, mailed Feb. 13, 2017.

*Primary Examiner* — Nicholas Giles
(74) *Attorney, Agent, or Firm* — Blakely Sokoloff Taylor and Zafman LLP

(57) ABSTRACT

A method and apparatus for auto range control are described. In one embodiment, the apparatus comprises a projector configured to project a sequence of light patterns on an object; a first camera configured to capture a sequence of images of the object illuminated with the projected light patterns; a controller coupled to the projector and first camera and operable to receive the sequence of images and perform range control by controlling power of the sequence of light patterns being projected on the object and exposure time of a camera based on information obtained from the sequence of images captured by the camera.

22 Claims, 6 Drawing Sheets

(56) References Cited

U.S. PATENT DOCUMENTS

| | | | |
|---|---|---|---|
| 8,760,499 B2* | 6/2014 | Russell | H04N 13/0203 348/46 |
| 8,908,958 B2* | 12/2014 | Kimmel | G01B 11/2509 348/50 |
| 2009/0238449 A1* | 9/2009 | Zhang | G06T 7/521 382/165 |
| 2010/0079481 A1 | 4/2010 | Zhang et al. | |
| 2010/0284591 A1* | 11/2010 | Arnon | A61B 5/015 382/128 |
| 2011/0050859 A1* | 3/2011 | Kimmel | G01B 11/2509 348/50 |
| 2011/0170767 A1* | 7/2011 | Lemonde | G01B 11/25 382/154 |
| 2012/0229816 A1 | 9/2012 | Rodrigue et al. | |
| 2013/0215235 A1* | 8/2013 | Russell | H04N 13/0203 348/47 |
| 2014/0240492 A1 | 8/2014 | Lee | |
| 2014/0307047 A1* | 10/2014 | Kirk | H04N 5/33 348/42 |
| 2014/0307057 A1* | 10/2014 | Kang | H04N 5/33 348/47 |
| 2014/0307058 A1* | 10/2014 | Kirk | H04N 5/33 348/47 |
| 2015/0145955 A1* | 5/2015 | Russell | H04N 13/0203 348/46 |
| 2015/0229915 A1 | 8/2015 | Kirk et al. | |

* cited by examiner

AUTO RANGE CONTROL FOR ACTIVE ILLUMINATION DEPTH CAMERA

FIELD OF THE INVENTION

Embodiments of the present invention relate to the field of camera systems that perform three-dimensional (3-D) measurements by use of triangulation capturing one or more images with the assistance of one or more patterns projected by a projector; more particularly, embodiments of the present invention relate to performing auto range control of such camera systems.

BACKGROUND OF THE INVENTION

Stereo depth cameras are well-known and are often used to measure a distance from an object. One such measurement device includes a projector and a camera and is often included in a coded-light three-dimensional (3D) camera system. In a coded-light three-dimensional (3D) camera, the projector projects a known pattern (e.g., a sequence of binary code patterns (e.g., vertical stripes)) on an object (e.g., a scene), and an image of the object upon which the image is projected is captured by the camera. From the captured images, depth information may be determined. One technique for determining depth in such devices is through the use of triangulation from the known relative positions of the camera and a projector. Thus, images of objects are captured and measurements are taken to determine depth information.

Cameras in the 3D camera systems have limited depth dynamic range. The depth dynamic range is dictated by the receiver electro-optic path. In situations of objects that are close to the camera with good albedo versus situations of far objects or poor albedo (reflectivity), the camera doesn't function well since it is either saturated or has very low signal-to-noise (SNR).

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical, electrical, or optical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

Figure 1:
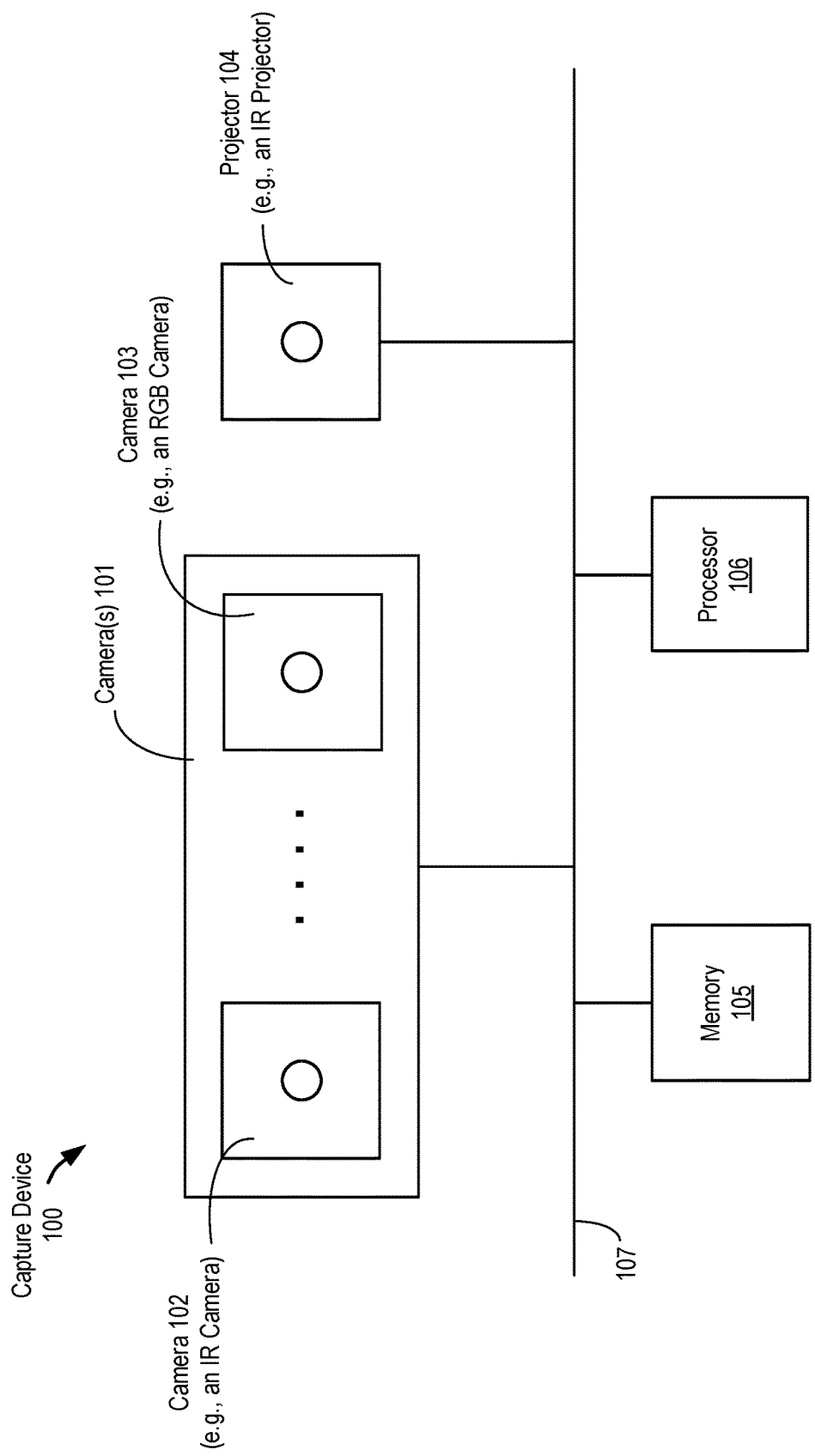
FIG. 1 illustrates one embodiment of an active coded light triangulation system.

FIG. 1 illustrates one embodiment of an active coded light triangulation system. The system includes coded light range cameras operating by projecting a sequence of one-dimensional binary ("black" and "white") patterns onto a scene, such that the produced binary code encodes the angle of the projection plane. Depth is then reconstructed by triangulation consisting of computing the intersection of an imaginary ray emanating from the camera with the plane emanating from the projector.

Referring to FIG. 1, capture device 100 may include a 3D scanner, a 3D camera or any other device configured for a 3D object acquisition. In some embodiments, as illustrated, capture device 100 includes an image capturing device 102 (e.g., a digital camera) and a projector unit 104, such as a laser projector or laser scanner, having a number of components. In some embodiments, digital camera 102 may comprise an infrared (IR) camera, and the projector unit 104 may comprise an IR projector.

Projector unit 104 is configured to project a light pattern as described above and may comprise a one-dimensional code projector. In one embodiment, the light patterns comprise one-dimensional coded light patterns, e.g., the patterns that may be described by one-dimensional or linear codes. The light patterns formed by the laser planes on a surface of the object may be received by image capturing device 102 and sensed (e.g., read) by a sensor of image capturing device 102. Based on the readings of the multiple scans of the light patterns accumulated during a sensing cycle of the sensor, capture device 100 may be configured to reconstruct the shape of the object.

In some embodiments, capture device 100 may further include another image capturing device, such as digital camera 103. In some embodiments, digital camera 103 may have a resolution that is different than that of digital camera 103. For example, digital camera 102 may be a multi-chromatic camera, such as red, green, and blue (RGB) camera configured to capture texture images of an object.

Capture device 100 may further include a processor 106 that may be in operative communication with the image camera component 101 over a bus or interconnect 107. Processor 106 may include a standardized processor, a specialized processor, a microprocessor, or the like that may execute instructions that may include instructions for generating depth information, generating a depth image, determining whether a suitable target may be included in the depth image, or performing other operations described herein.

Processor 106 may be configured to reconstruct the object based on the images captured by digital camera 102, for example, using geometry techniques or other techniques used for 3D image reconstruction. Processor 106 may be further configured to dynamically calibrate capture device 100 to correct distortions in the reconstructed image of the object that may be caused, for example, by various external factors (e.g., temperature).

Capture device 100 may further include a memory 105 that may store the instructions that may be executed by processor 106, images or frames of images captured by the cameras, user profiles or any other suitable information, images, or the like. According to one example, memory 105 may include random access memory (RAM), read only memory (ROM), cache, Flash memory, a hard disk, or any other suitable storage component. As shown in FIG. 1, memory component 105 may be a separate component in communication with the cameras 101 and processor 106. Alternatively, memory 105 may be integrated into processor 106 and/or the image capture cameras 101. In one embodiment, some or all of the components 102-106 are located in a single housing.

Processor 105, memory 104, other components (not shown), image capturing device 102, and projector unit 104 may be coupled with one or more interfaces (not shown) configured to facilitate information exchange among the above-mentioned components. Communications interface(s) (not shown) may provide an interface for device 100 to communicate over one or more wired or wireless network(s) and/or with any other suitable device. In various embodiments, capture device 100 may be included to or associated with, but is not limited to, a server, a workstation, a desktop computing device, or a mobile computing device (e.g., a laptop computing device, a handheld computing device, a handset, a tablet, a smartphone, a netbook, ultra-book, etc.).

In one embodiment, capture device 100 is integrated into a computer system (e.g., laptop, personal computer (PC), etc.). However, capture device 100 can be alternatively configured as a standalone device that is couplable to such a computer system using conventional technologies including both wired and wireless connections.

In various embodiments, capture device 100 may have more or less components, and/or different architectures. For example, in some embodiments, capture device 100 may include one or more of a camera, a keyboard, display such as a liquid crystal display (LCD) screen (including touch screen displays), a touch screen controller, non-volatile memory port, antenna or multiple antennas, graphics chip, ASIC, speaker(s), a battery, an audio codec, a video codec, a power amplifier, a global positioning system (GPS) device, a compass, an accelerometer, a gyroscope, and the like. In various embodiments, capture device 100 may have more or less components, and/or different architectures. In various embodiments, techniques and configurations described herein may be used in a variety of systems that benefit from the principles described herein.

Capture device 100 may be used for a variety of purposes, including, but not limited to, being part of a target recognition, analysis, and tracking system to recognize human and non-human targets in a capture area of the physical space without the use of special sensing devices attached to the subjects, uniquely identify them, and track them in three-dimensional space. Capture device 100 may be configured to capture video with depth information including a depth image that may include depth values via any suitable technique including, for example, triangulation, time-of-flight, structured light, stereo image, or the like.

Capture device 100 may be configured to operate as a depth camera that may capture a depth image of a scene. The depth image may include a two-dimensional (2D) pixel area of the captured scene where each pixel in the 2D pixel area may represent a depth value such as a distance in, for example, centimeters, millimeters, or the like of an object in the captured scene from the camera. In this example, capture device 100 includes an IR light projector 404, an IR camera 102, and a visible light RGB camera 103 that are configured in an array.

Various techniques may be utilized to capture depth video frames. For example, capture device 100 may use structured light to capture depth information. In such an analysis, patterned light (i.e., light displayed as a known pattern such as a grid pattern or a stripe pattern) may be projected onto the capture area via, for example, IR light projector 104. Upon striking the surface of one or more targets or objects in the capture area, the pattern may become deformed in response. Such a deformation of the pattern may be captured by, for example, he IR camera 102 and/or the RGB camera 103 and may then be analyzed to determine a physical distance from capture device 100 to a particular location on the targets or objects.

Capture device 100 may utilize two or more physically separated cameras that may view a capture area from different angles, to obtain visual stereo data that may be resolved to generate depth information. Other types of depth image arrangements using single or multiple cameras can also be used to create a depth image.

Capture device 100 may provide the depth information and images captured by, for example, IR camera 102 and/or the RGB camera 103, including a skeletal model and/or facial tracking model that may be generated by capture device 100, where the skeletal and/or facial tracking models, depth information, and captured images are used to, for example, create a virtual screen, adapt the user interface, and control an application.

In summary, capture device 100 may comprise a projector unit 104, a digital camera (e.g., IR camera) 102, another digital camera (e.g., multi-chromatic camera) 103, and a processor (controller) configured to operate capture device 100 according to the embodiments described herein. However, the above assembly configuration is described for illustration purposes only, and is should not be limiting to the present disclosure. Various configurations of an assembly for a 3D object acquisition may be used to implement the embodiments described herein. For example, an assembly for a 3D object acquisition configured to enable the reconstructed object distortion corrections may include three digital cameras, two of which may be used to reconstruct a 3D image of an object, and the third camera (e.g. with a resolution that is different than those of the two cameras) may be used to capture images of the object in order to identify image distortions in the reconstructed object and to compensate for identified distortions.

Automatic Range Control for a Depth Camera

In one embodiment, the system includes a controller to control the camera (e.g., IR camera) and the projector (e.g., IR projector) to perform range control. In one embodiment, the controller is part of processor 106, working in conjunction with software stored in memory 105 of the capture device of FIG. 1. In one embodiment, the controller controls both the power of the projected light from the projector and the exposure time of the camera to perform range control. In one embodiment, the control of the power of the projected light from the projector and the exposure time of the camera is based on the scene analysis. In this case, the scene analysis involves determining the amount of light that is being reflected back from an object in the scene, as opposed to analyzing content in the scene. In one embodiment, the control results in an enlarged depth dynamic range in the near and far ends of the range. In one embodiment, in the near range, using the techniques disclosed herein, the dynamic range increases from 25 cm to 3 cm, while in the far end, the dynamic range goes from 70 cm to 1.8 m.

By observing the statistics of the imaged object, the controller controls the exposure of the camera and/or the light (laser) power of the projector in order to avoid camera saturation at close range (e.g., less than 30 cm) of highly reflective objects at one near end of the dynamic range, while still being able to capture low reflective objects at a large distance at the other far end of the dynamic range. These techniques result in an increased range and quality of the digital captured image. The increased quality enables increased accuracy of depth profiles and allows the system to adapt itself to the operation environment to produce the best possible results.

Figure 2:
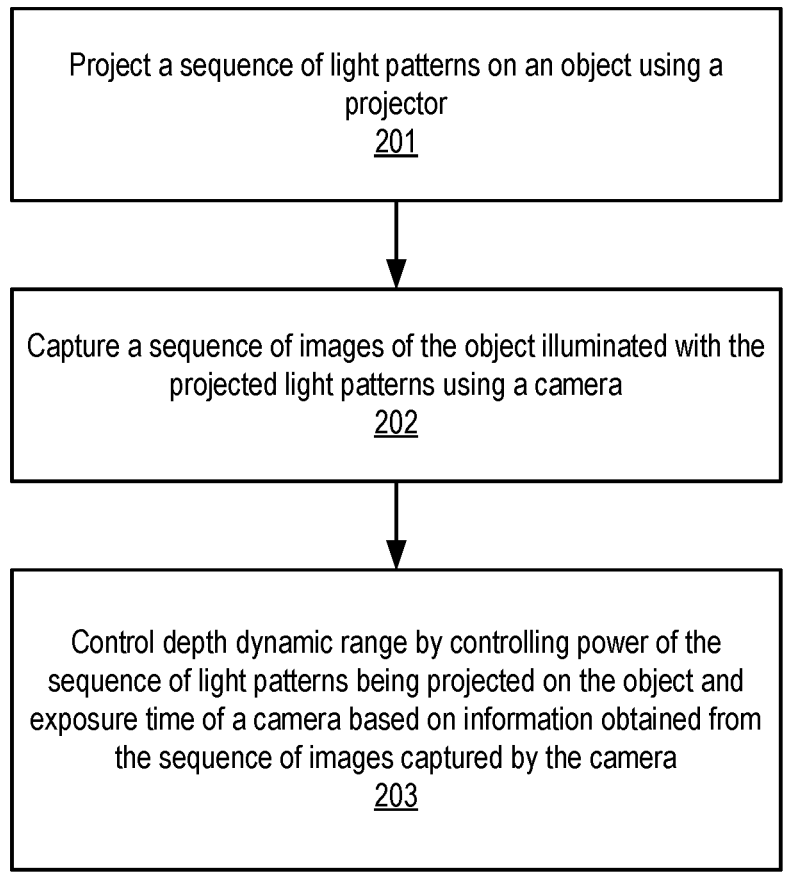
FIG. 2 is a flow diagram of one embodiment of a process for controlling the depth dynamic range.

FIG. 2 is a flow diagram of one embodiment of a process for controlling the depth dynamic range. The process is performed by processing logic that may comprise hardware (circuitry, dedicated logic, etc.), software (such as is run on a general purpose computer system or a dedicated machine), firmware, or a combination of the three.

Referring to FIG. 2, the process begins by processing logic projecting a sequence of light patterns on an object (processing block 201). In one embodiment, the processing logic is part of a projector. In another embodiment, the processing logic is part of a controller sends control signals to the projector to cause the projector to project light onto the object.

Next, processing logic captures a sequence of images of the object illuminated with the projected light patterns using a camera (processing block 202). In one embodiment, the processing logic is part of a controller sends control signals to the camera to cause the camera to capture the sequence of images of the illuminated object.

Using the captured sequence of images, processing logic controls the depth dynamic range of the camera by controlling the power of the sequence of light patterns being projected on the object by the projector and the exposure time of a camera (processing block 203). In one embodiment, information is obtained from the captured sequence of images for use in controlling the depth dynamic range. In one embodiment, the information comprises intensity information associated with a sequence of images captured by the camera. In another embodiment, the intensity information comprises an average intensity of a difference between intensity of a sequence of images captured by the camera.

In one embodiment, the controller obtains its statistics from a sequence of captured images. For example, in one embodiment, the statistics are from the n−1 sequence (e.g., the previous, or last, sequence of captured images) including: an image captured while the active light is on (e.g., the laser is on) referred to herein as I_1 and an image captured when the active light is off (e.g., the laser is off) referred to herein as I_0. Using these two images, the controller generates another image. In one embodiment, this additional image is an icon image and is generated by subtracting the image captured while the active light is off from the image captured when the active light is on (i.e., Ic=I_1−I_0). In one embodiment, each of I_1 and I_0 is a matrix of the image, which each entry in the matrix being the value of the illumination of a pixel for the image. These values in corresponding locations in two matrices are subtracted from each other to obtain the icon image (Ic).

After obtaining the icon image, the controller determines an average intensity value for the icon image. In one embodiment, the average intensity value is determined by averaging all of the intensity values in the icon image (e.g., the intensity values in the icon image matrix). In another embodiment, the average intensity value is determined by averaging a subset of the intensity values of the icon image (e.g., the intensity values in the icon image matrix). The average intensity value of the icon image Ic, or power score, is denoted as Ps herein.

Using the power score, in one embodiment, the controller controls the depth dynamic range according to the following action rules:

```
If (Ps > Threshold 1)
    {
    if exposure is minimal (e.g., the exposure has reached a preset minimal value), then decrease laser power
        else decrease camera exposure
    }
If (Ps < Threshold 2)
    {
    if laser power is maximal (e.g., the laser power has reached a preset maximum value), then increase exposure
        else increase laser power
    }
```

In one embodiment, Threshold 1 is 1250 and Threshold 2 is 650. In one embodiment, these thresholds are learned statistically on several units and are dependent on the range of exposure values required and the effective Z field of view (FOV). For short range applications, in one embodiment, Threshold 1 is increased and Threshold 2 is decreased, and vice versa for far range applications.

In one embodiment, the laser gain increases and decreases are stepped at five percent of the range, while exposure increases and decreases are made at steps of 0.2 ms. Note that other step sizes may be used and the increase and decrease step sizes need not be the same. Note that in one embodiment, the increases and decreases are made based on recognizing that light follows an inverse-square law in that the intensity is inversely proportional to the square of the distance from the source of that physical quantity. Thus, in such cases, decreases and increases change quadratically, as opposed to following a linear path.

Figure 3:
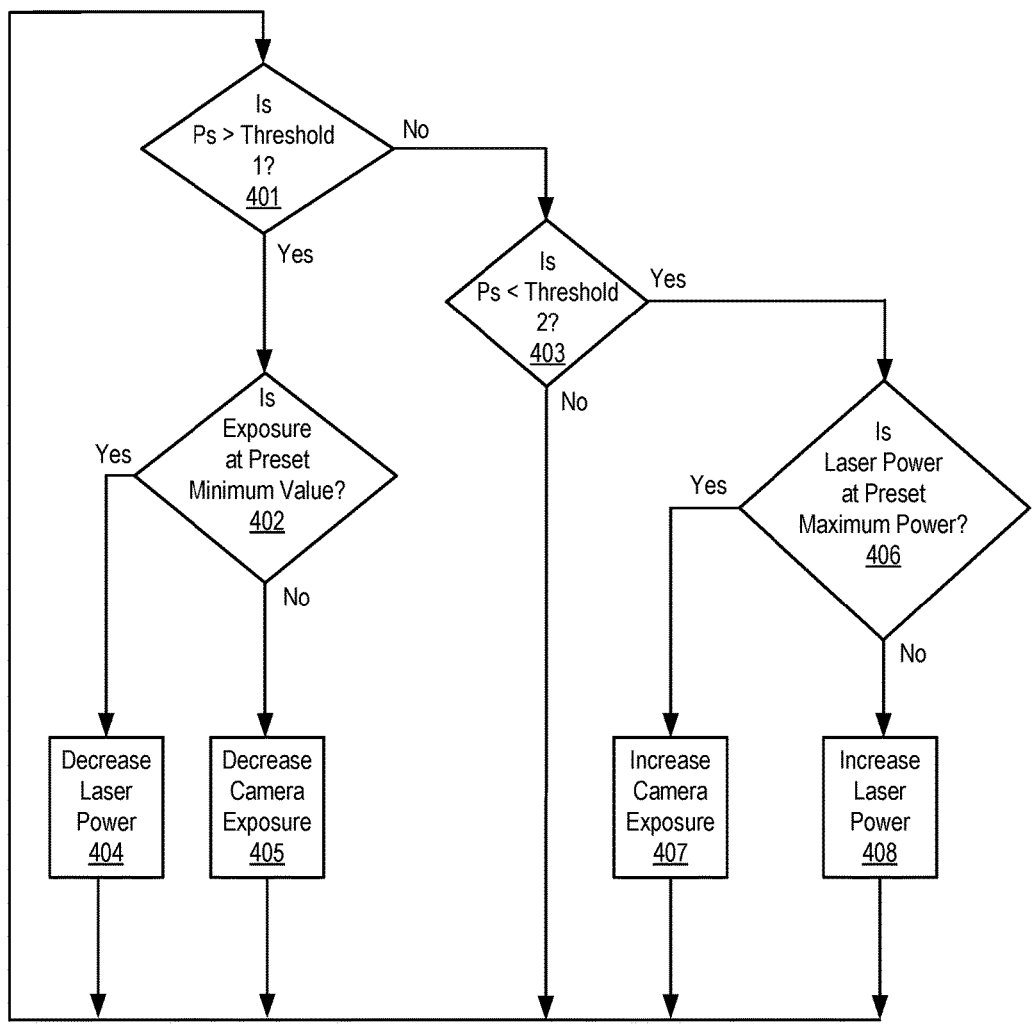
FIG. 3 is a flow diagram of one embodiment of the process for controlling the depth dynamic range by controlling the light power and the exposure time.

FIG. 3 is a flow diagram of one embodiment of the process for controlling the depth dynamic range described above. The process is performed by processing logic that may comprise hardware (circuitry, dedicated logic, etc.), software (such as is run on a general purpose computer system or a dedicated machine), firmware, or a combination of the three.

Referring to FIG. 3, the controller compares the power score to a pair of thresholds, a first threshold and a second threshold, and controls depth dynamic range by:

decreasing the projector laser power if average intensity between a sequence of images captured by the camera is above a first threshold and the camera exposure is set to a preset minimal value;

decreasing the exposure of the camera if the average intensity between a sequence of images captured by the camera is above the first threshold and the camera exposure is not set to the preset minimal value;

increasing the camera exposure of the camera if average intensity between a sequence of images captured by the camera is below a second threshold and the projector laser power is set to a preset minimal value; and decreasing the projector laser power if average intensity between a sequence of images captured by the camera is below a second threshold and the projector laser power is not set to the preset minimal value.

Example Operational Modes

In one embodiment, the controller the camera and projector using a number of different operations modes. These operational modes include an automatic (auto) laser gain mode, automatic (auto) exposure time mode, and auto laser gain with auto exposure time mode. The auto laser gain with auto exposure time mode controls the depth dynamic range of the camera by controlling the power of the sequence of light patterns being projected on the object by the projector and the exposure time of a camera using a number of operation modes. Each of these modes is discussed in more detail below.

Auto Laser Gain

When enabled, the controller decreases the laser gain if an object is close (or moves close) to the camera sensor to avoid saturation and increases the laser gain when the object moves away from the camera sensor. In one embodiment, the controller has a default control setting to have the laser gain always be at the highest laser gain possible.

Auto Exposure Time

When enabled, in one embodiment, the controller changes the exposure time automatically when the object gets far from the camera sensor to increase the dynamic range of the camera.

Auto Laser Gain with Auto Exposure

Figure 4:
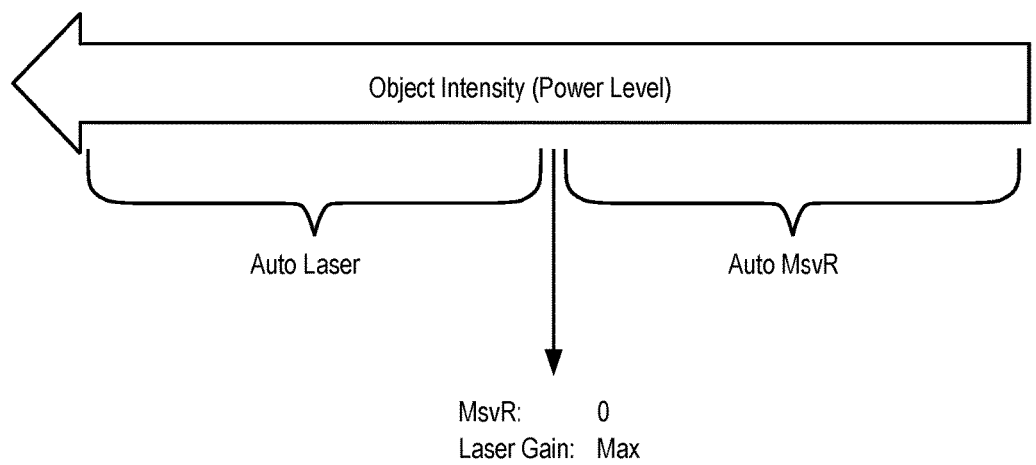
FIG. 4 illustrates one embodiment of the auto gain and auto exposure domain of operation.

When both features are enabled, the controller activates the auto laser gain when the object intensity rises. When the object intensity decreases, the controller increases the laser gain until it reaches the maximal value (e.g., preset maximum value). When the laser gain reaches its maximal value, the controller activates the auto exposure and increases the exposure as required. When the object intensity increases again, the controller decreases the exposure until a minimal value (e.g., a preset minimum value) and activates the auto laser gain and so forth. FIG. 4 illustrates one embodiment of the auto gain and auto exposure domain of operation. Referring to FIG. 4, the object intensity (power level) is shown with a point in the middle of the object intensity bar being the point where MsvR (Motion vs Range trade off, or exposure time) is equal to zero and the laser gain is at its maximum value. To one side (left) of this point, the controller uses auto laser gain control, while on the other side of the point (right), the controller use auto exposure control. In other words, in one embodiment, on one side of the point, the controller can only decrease laser while, while on the other side, the controller can only increase the exposure time.

An Example of a Control Algorithm

Algorithm Input

In one embodiment, the control algorithm uses an iconed version of the IR image (e.g., averaged and subsampled intensity IR image). In another embodiment, the control algorithm uses an IR image (created from the projector of the capture device).

Algorithm Output

In one embodiment, the algorithm outputs a decision to change either the laser power or the exposure. In one embodiment, the output indication to change the power is as follows:

−1: decrease the power
0: do not change the power
1: increase the power

According to the operation mode and the current power level, the controller changes the laser power or the exposure control.

Configuration

One embodiment of the parameters and their default values are given below. In one embodiment, these parameters are configurable.

| Parameter Name | Default | Description |
|---|---|---|
| LowerTh | 0.1 | The lower threshold below which the power level is increased |
| UpperTh | 0.3 | The upper threshold above which the power level is descreased |
| WindowSize | 3 | The size of the average window - the number of power scores to accumulate in the average |
| ZeroTrendFrameCount | 20 | The number of frames in the same power level to start the trend to zero after. |
| ZeroTrendMargin | 0.01 | The margin from the thresholds that below it no zero trend is allowed |
| PowerLevelThSlope | 0 | The slope of the threshold as a function of the power level |
| relativeIRwindowSize | 11 | The size of the relative I1 decision, which controls the jitteriness of switching from I1 to relative I1 and back |
| I0MeanTh | 5 | The mean of I0 above which the ambient light overflow might occur |
| I1I0RatioTh | 1.25 | The ration between I1 and I0 below which ambient light overflow might occur |

Power Score Calculation

In one embodiment, to begin the algorithm, the "power score" is calculated. In one embodiment, the power score is calculated as follows. For each bin in a histogram calculated by the controller on a selected region of interest (ROI) in the icon image, the sum is calculated by multiplying the number of pixels in the bin by the bin index, and then that product is divided by the number of pixels multiplied by the maximum possible bin index (e.g., 255). In one embodiment, the following formula calculates the "power score" (average intensity [0,1]):

$$PowerScore = \frac{\sum_{i=0}^{255}(Hist[i] * i)}{255 * \sum_{i=0}^{255}(Hist[i])} \in [0, 1]$$

One Embodiment of the Control Algorithm

The following pseudo code describes one embodiment of the control algorithm. In one embodiment, these operations are performed by the controller.

1. Calculate power score of I0→I0 Score
2. Calculate power score of I1→I1 Score
3. Calculate power score→Score=I1Score−I0Score The first three operations above determine the power score that is used to control the algorithm.

4. Update scoreswindow→ScoresWindow [frameIndex mod windowSize]=Score

In one embodiment, the power scores are aggregated over consecutive image captures in time to determine if there is a trend. In one embodiment, the window size (windowSize) is usually 1-3. In one embodiment, this is configurable. The scores are aggregated into an array.

5. Calculate relative IRstatus→
a. If I0Score>I0MeanTh/255 AND (I1Score/I0Score)<I1I0RatioTh
This condition determines if there is too much ambient light in the image: the dark image is to bright and the ration between the bright and dark images it too close to one according to one embodiment.
relativeIRstatus=0
b. else
relativeIRstatus=1
6. Update Relative IR status window→
RelativeIRWindow[I mod relativeIRwindowSize]=relativeIRstatus In one embodiment, this operation determines the amount of ambient light in the scene. If the amount of ambient light is too big, then the status is set to 1. If the amount of ambient light is too low, the status is set to 0. This is track so that in the case the ambient light is too big, then increasing the laser power and/or increasing the exposure is not performed to avoid increasing the amount of saturation. Note that in one embodiment, this is tracked over a number of consecutive image captures using a window (e.g., ten samples) to reduce the likelihood of noise influencing the process.
7. If RelativeIRWindow is full
If the RelativeIRWindow is full, then there is enough samples to proceed.
a. AvgStatus=Average (RelativeIRWindow)
The average of the values in the RelativeIRWindow is determined.
b. If AvgStatus>0.8
newRelativeIRStatus=1
Else if AvgStatus<0.2
newRelativeIRStatus=0
In one embodiment, if the average (AvgStatus) is greater than 0.8, then there is too much ambient light, while if the average is less than 0.2, then there isn't too much ambient light.
8. If ScoresWindow is full
If the ScoresWindow is full, then there are enough samples to proceed.
a. Calculate average score in the window
→AvgScore=Average (ScoresWindow)
If there are enough samples, then the average score (AvgScore) of the intensity values in the ScoresWindow is calculated. Based on that average score and its relation to two thresholds, the controller controls the depth dynamic range using 8b-d below.
b. If AvgScore>UpperTh+PowerLevelThSlope*CurrPowerLevel
  i. NextPowerLevel=CurrPowerLevel−1;
  ii. empty ScoresWindow
  iii. LastFixIdx=0
If the average score of the intensity values is greater than the sum of upper threshold (above which the power level is decreased) and the product of the slope of the threshold as a function of the power level and the current power level, then the current power level is reduced by 1, the window of intensity values is cleared and a variable tracking when the last change was made by the controller is reset (e.g., set to zero). Note that the slope is meant to make it harder to cross reach distant power levels by increasing the threshold that the power score (Ps) should cross in order to get further from the target power level. In one embodiment, the slope is configurable, and can be 0 (unused).

c. ifAvgScore<LowerTh+PowerLevelThSlope*CurrPowerLevel
  i. NextPowerLevel=CurrPowerLevel+1
  ii. empty ScoresWindow
  iii. LastFixIdx=0
If the average score of the intensity values is less than the sum of lower threshold (below which the power level is increased) and the product of the slope of the threshold as a function of the power level and the current power level, then the current power level is increased by 1, the window of intensity values is cleared and a variable tracking when the last change was made by the controller is reset (e.g., set to zero).
d. else (AvgScore between the margins)
  i. LastFixIdx++
  ii. If (LastFixIdx>ZeroTrendFrameCount) AND
{((power level>0) and AvgScore>LowerTh+ZeroTrendMargin)
OR
(power level<0) and AvgScore<UpperTh−ZeroTrendMargin)}
Then NextPowerLevel=CurrPowerLevel−Sign (CurrPowerLevel)
If the average score of the intensity values is between the thresholds, then the controller doesn't change the power level, the window of intensity values is not cleared and a variable tracking when the last change was made by the controller is incremented (e.g., incremented by one).

In one embodiment, if the value of the variable tracking when the last change was made exceeds the zero trend frame count, indicating that the power level has remained the same for a number of frames and the power level and based on the power level and the relation between the average score of the intensity values and both the lower and upper thresholds, then the controller than calculates the next power level based on a difference between the current power level and the sign of the current power level. This recognizes that when the power level has remained the same for a certain number of frames, then the controller is able to move back to a nominal power level that the camera system is selected to work at.
9. If relativeIRstatus==0
Set powerLevel to zero state
Else
Return (CurrPowerLevel−NextPowerLevel)
In one embodiment, if there is too much ambient light (as indicated by relativeIR status being set to 0), then the power level is set to zero, which means that there is minimal exposure time (e.g., exposure time is at a preset minimum value) and the laser power is set to its maximum value (FIG. 4). If there is not too much ambient light, the next power level is set to the difference between the values of the current power level and next power level.

Thus, in one embodiment, the "nextPowerLevel" indicates whether to increase or decrease the power. Once this is set, the decision about whether to change the laser power or the exposure is made, dependent on the current setting, according to the graph shown in FIG. 4.

In one embodiment, the range control is implemented in the camera device itself. In another embodiment, this is implemented in a host. There are advantages to close this kind of control loop in a lower level (device level).

Figure 5:
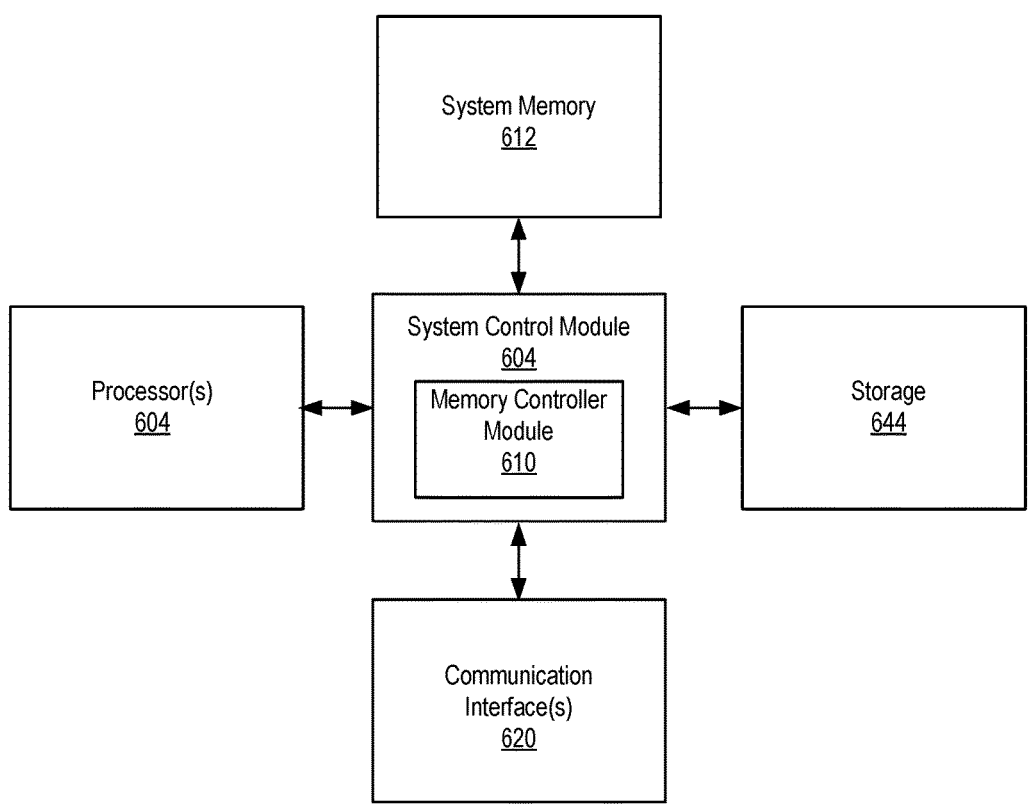
FIG. 5 illustrates one embodiment of an example system.

FIG. 5 illustrates one embodiment of an example system 600 having one or more processor(s) 604, system control module 608 coupled to at least one of the processor(s) 604, system memory 612 coupled to system control module 608, non-volatile memory (NVM)/storage 614 coupled to system control module 608, and one or more communications interface(s) 620 coupled to system control module 608. In some embodiments, the system 600 may include capture device 100 and provide logic/module that performs functions aimed at depth and texture calibration, along with depth reconstruction and other functions, described herein.

In some embodiments, the system 600 may include one or more computer-readable media (e.g., system memory or NVM/storage 614) having instructions and one or more processors (e.g., processor(s) 604) coupled with the one or more computer-readable media and configured to execute the instructions to implement a module to perform depth and texture calibration, along with depth reconstruction and other functions, described herein.

System control module 608 for one embodiment may include any suitable interface controllers to provide for any suitable interface to at least one of the processor(s) 604 and/or to any suitable device or component in communication with system control module 608.

System control module 608 may include memory controller module 610 to provide an interface to system memory 612. The memory controller module 610 may be a hardware module, a software module, and/or a firmware module. System memory 612 may be used to load and store data and/or instructions, for example, for system 600. System memory 612 for one embodiment may include any suitable volatile memory, such as suitable DRAM, for example. System control module 608 for one embodiment may include one or more input/output (I/O) controller(s) to provide an interface to NVM/storage 614 and communications interface(s) 620.

The NVM/storage 614 may be used to store data and/or instructions, for example. NVM/storage 614 may include any suitable non-volatile memory, such as flash memory, for example, and/or may include any suitable non-volatile storage device(s), such as one or more hard disk drive(s) (HDD(s)), one or more compact disc (CD) drive(s), and/or one or more digital versatile disc (DVD) drive(s), for example. The NVM/storage 614 may include a storage resource physically part of a device on which the system 600 is installed or it may be accessible by, but not necessarily a part of, the device. For example, the NVM/storage 614 may be accessed over a network via the communications interface(s) 620.

Communications interface(s) 620 may provide an interface for system 600 to communicate over one or more network(s) and/or with any other suitable device. The system 600 may wirelessly communicate with the one or more components of the wireless network in accordance with any of one or more wireless network standards and/or protocols.

For one embodiment, at least one of the processor(s) 604 may be packaged together with logic for one or more controller(s) of system control module 608, e.g., memory controller module 610. For one embodiment, at least one of the processor(s) 604 may be packaged together with logic for one or more controllers of system control module 608 to form a System in Package (SiP). For one embodiment, at least one of the processor(s) 604 may be integrated on the same die with logic for one or more controller(s) of system control module 608. For one embodiment, at least one of the processor(s) 604 may be integrated on the same die with logic for one or more controller(s) of system control module 608 to form a System on Chip (SoC).

In various embodiments, the system 600 may have more or less components, and/or different architectures. For example, in some embodiments, the system 600 may include one or more of a camera, a keyboard, liquid crystal display (LCD) screen (including touch screen displays), non-volatile memory port, multiple antennas, graphics chip, application-specific integrated circuit (ASIC), and speakers.

In various implementations, the system 600 may be, but is not limited to, a mobile computing device (e.g., a laptop computing device, a handheld computing device, a tablet, a netbook, etc.), a laptop, a netbook, a notebook, an ultrabook, a smartphone, a tablet, a personal digital assistant (PDA), an ultra mobile PC, a mobile phone, a desktop computer, a server, a printer, a scanner, a monitor, a set-top box, an entertainment control unit, a digital camera, a portable music player, or a digital video recorder. In further implementations, the system 600 may be any other electronic device.

Figure 6:
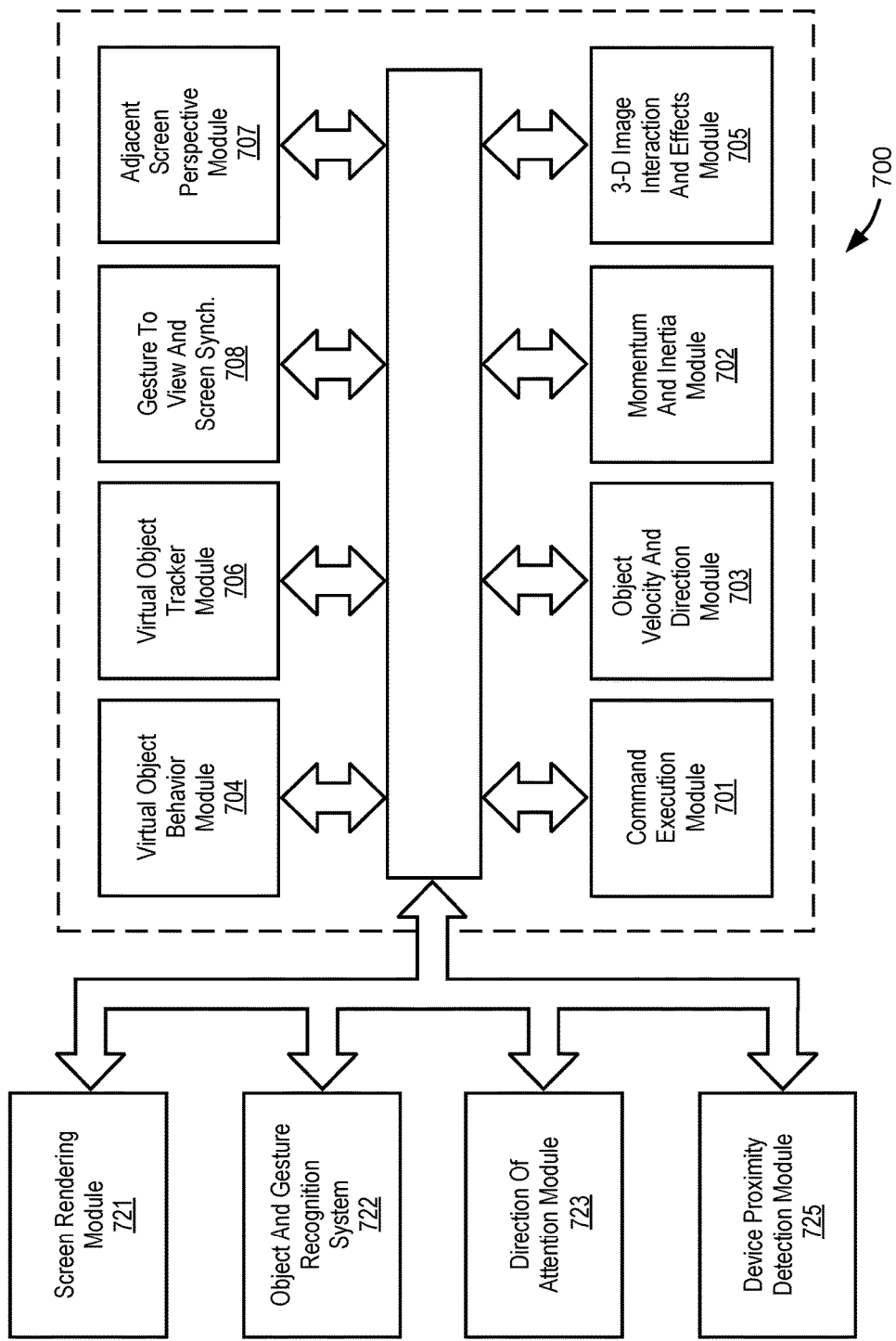
FIG. 6 illustrates an embodiment of a computing environment capable of supporting the operations described herein.

FIG. 6 illustrates an embodiment of a computing environment 700 capable of supporting the operations discussed above. The modules described before can use the depth information (e.g., values) and other data described above to perform these functions. The modules and systems can be implemented in a variety of different hardware architectures and form factors.

Command Execution Module 701 includes a central processing unit to cache and execute commands and to distribute tasks among the other modules and systems shown. It may include an instruction stack, a cache memory to store intermediate and final results, and mass memory to store applications and operating systems. Command Execution Module 701 may also serve as a central coordination and task allocation unit for the system.

Screen Rendering Module 721 draws objects on the one or more multiple screens for the user to see. It can be adapted to receive the data from Virtual Object Behavior Module 704, described below, and to render the virtual object and any other objects and forces on the appropriate screen or screens. Thus, the data from Virtual Object Behavior Module 704 would determine the position and dynamics of the virtual object and associated gestures, forces and objects, for example, and Screen Rendering Module 721 would depict the virtual object and associated objects and environment on a screen, accordingly. Screen Rendering Module 721 could further be adapted to receive data from Adjacent Screen Perspective Module 707, described below, to either depict a target landing area for the virtual object if the virtual object could be moved to the display of the device with which Adjacent Screen Perspective Module 707 is associated. Thus, for example, if the virtual object is being moved from a main screen to an auxiliary screen, Adjacent Screen Perspective Module 707 could send data to the Screen Rendering Module 721 to suggest, for example in shadow form, one or more target landing areas for the virtual object on that track to a user's hand movements or eye movements.

Object and Gesture Recognition System 722 may be adapted to recognize and track hand and harm gestures of a user. Such a module may be used to recognize hands, fingers, finger gestures, hand movements and a location of hands relative to displays. For example, Object and Gesture Recognition System 722 could for example determine that a user made a body part gesture to drop or throw a virtual object onto one or the other of the multiple screens, or that the user made a body part gesture to move the virtual object to a bezel of one or the other of the multiple screens. Object and Gesture Recognition System 722 may be coupled to a camera or camera array, a microphone or microphone array, a touch screen or touch surface, or a pointing device, or some combination of these items, to detect gestures and commands from the user.

The touch screen or touch surface of Object and Gesture Recognition System 722 may include a touch screen sensor.

Data from the sensor may be fed to hardware, software, firmware or a combination of the same to map the touch gesture of a user's hand on the screen or surface to a corresponding dynamic behavior of a virtual object. The sensor date may be used to momentum and inertia factors to allow a variety of momentum behavior for a virtual object based on input from the user's hand, such as a swipe rate of a user's finger relative to the screen. Pinching gestures may be interpreted as a command to lift a virtual object from the display screen, or to begin generating a virtual binding associated with the virtual object or to zoom in or out on a display. Similar commands may be generated by Object and Gesture Recognition System 722, using one or more cameras, without the benefit of a touch surface.

Direction of Attention Module 723 may be equipped with cameras or other sensors to track the position or orientation of a user's face or hands. When a gesture or voice command is issued, the system can determine the appropriate screen for the gesture. In one example, a camera is mounted near each display to detect whether the user is facing that display. If so, then the direction of attention module information is provided to Object and Gesture Recognition Module 722 to ensure that the gestures or commands are associated with the appropriate library for the active display. Similarly, if the user is looking away from all of the screens, then commands can be ignored.

Device Proximity Detection Module 725 can use proximity sensors, compasses, GPS (global positioning system) receivers, personal area network radios, and other types of sensors, together with triangulation and other techniques to determine the proximity of other devices. Once a nearby device is detected, it can be registered to the system and its type can be determined as an input device or a display device or both. For an input device, received data may then be applied to Object Gesture and Recognition System 722. For a display device, it may be considered by Adjacent Screen Perspective Module 707.

Virtual Object Behavior Module 704 is adapted to receive input from Object Velocity and Direction Module 703, and to apply such input to a virtual object being shown in the display. Thus, for example, Object and Gesture Recognition System 722 would interpret a user gesture and by mapping the captured movements of a user's hand to recognized movements, Virtual Object Tracker Module 706 would associate the virtual object's position and movements to the movements as recognized by Object and Gesture Recognition System 722, Object and Velocity and Direction Module 703 would capture the dynamics of the virtual object's movements, and Virtual Object Behavior Module 704 would receive the input from Object and Velocity and Direction Module 703 to generate data that would direct the movements of the virtual object to correspond to the input from Object and Velocity and Direction Module 703.

Virtual Object Tracker Module 706 on the other hand may be adapted to track where a virtual object should be located in three-dimensional space in a vicinity of a display, and which body part of the user is holding the virtual object, based on input from Object Gesture and Recognition System 722. Virtual Object Tracker Module 706 may for example track a virtual object as it moves across and between screens and track which body part of the user is holding that virtual object. Tracking the body part that is holding the virtual object allows a continuous awareness of the body part's air movements, and thus an eventual awareness as to whether the virtual object has been released onto one or more screens.

Gesture to View and Screen Synchronization Module 708, receives the selection of the view and screen or both from Direction of Attention Module 723 and, in some cases, voice commands to determine which view is the active view and which screen is the active screen. It then causes the relevant gesture library to be loaded for Object and Gesture Recognition System 722. Various views of an application on one or more screens can be associated with alternative gesture libraries or a set of gesture templates for a given view.

Adjacent Screen Perspective Module 707, which may include or be coupled to Device Proximity Detection Module 725, may be adapted to determine an angle and position of one display relative to another display. A projected display includes, for example, an image projected onto a wall or screen. The ability to detect a proximity of a nearby screen and a corresponding angle or orientation of a display projected therefrom may for example be accomplished with either an infrared emitter and receiver, or electromagnetic or photo-detection sensing capability. For technologies that allow projected displays with touch input, the incoming video can be analyzed to determine the position of a projected display and to correct for the distortion caused by displaying at an angle. An accelerometer, magnetometer, compass, or camera can be used to determine the angle at which a device is being held while infrared emitters and cameras could allow the orientation of the screen device to be determined in relation to the sensors on an adjacent device. Adjacent Screen Perspective Module 707 may, in this way, determine coordinates of an adjacent screen relative to its own screen coordinates. Thus, the Adjacent Screen Perspective Module may determine which devices are in proximity to each other, and further potential targets for moving one or more virtual object's across screens. Adjacent Screen Perspective Module 707 may further allow the position of the screens to be correlated to a model of three-dimensional space representing all of the existing objects and virtual objects.

Object and Velocity and Direction Module 703 may be adapted to estimate the dynamics of a virtual object being moved, such as its trajectory, velocity (whether linear or angular), momentum (whether linear or angular), etc. by receiving input from Virtual Object Tracker Module 706. The Object and Velocity and Direction Module 703 may further be adapted to estimate dynamics of any physics forces, by for example estimating the acceleration, deflection, degree of stretching of a virtual binding, etc. and the dynamic behavior of a virtual object once released by a user's body part. Object and Velocity and Direction Module 703 may also use image motion, size and angle changes to estimate the velocity of objects, such as the velocity of hands and fingers Momentum and Inertia Module 702 can use image motion, image size, and angle changes of objects in the image plane or in a three-dimensional space to estimate the velocity and direction of objects in the space or on a display. Momentum and Inertia Module 702 is coupled to Object and Gesture Recognition System 722 to estimate the velocity of gestures performed by hands, fingers, and other body parts and then to apply those estimates to determine momentum and velocities to virtual objects that are to be affected by the gesture.

3D Image Interaction and Effects Module 705 tracks user interaction with 3D images that appear to extend out of one or more screens. The influence of objects in the z-axis (towards and away from the plane of the screen) can be calculated together with the relative influence of these objects upon each other. For example, an object thrown by a user gesture can be influenced by 3D objects in the foreground before the virtual object arrives at the plane of the screen. These objects may change the direction or velocity of the projectile or destroy it entirely. The object can be rendered by the 3D Image Interaction and Effects Module 705 in the foreground on one or more of the displays.

In a first example embodiment, an apparatus comprises a projector configured to project a sequence of light patterns on an object, a first camera configured to capture a sequence of images of the object illuminated with the projected light patterns, and a controller coupled to the projector and first camera and operable to receive the sequence of images and perform range control by controlling power of the sequence of light patterns being projected on the object and exposure time of a camera based on information obtained from the sequence of images captured by the camera.

In another example embodiment, the subject matter of the first example embodiment can optionally include that the information comprises intensity information associated with a sequence of images captured by the camera. In another example embodiment, the subject matter of this example embodiment can optionally include that the intensity information comprises an average intensity of a difference between intensity of a sequence of images captured by the camera.

In another example embodiment, the subject matter of the first example embodiment can optionally include that the controller is operable to control depth dynamic range by decreasing the projector power if average intensity between a sequence of images captured by the camera is above a first threshold and the camera exposure is set to a preset minimal value and decreasing the exposure of the camera if the average intensity between a sequence of images captured by the camera is above the first threshold and the camera exposure is not set to the preset minimal value.

In another example embodiment, the subject matter of the first example embodiment can optionally include that the controller is operable to control depth dynamic range by increasing the camera exposure of the camera if average intensity between a sequence of images captured by the camera is below a second threshold and the projector power is set to a preset minimal value and decreasing the projector power if average intensity between a sequence of images captured by the camera is below a second threshold and the projector laser power is not set to the present minimal value.

In another example embodiment, the subject matter of the first example embodiment can optionally include that the controller is operable to control power of the sequence of light patterns being projected on the object and exposure time of a camera based on information obtained from the sequence of images captured by the camera by performing automatic projector gain and automatic exposure control based on object intensity. In another example embodiment, the subject matter of this example embodiment can optionally include that performing automatic projector gain and automatic exposure control comprises activating automatic projector gain when object intensity associated with the object increases and increasing projector gain as the object intensity decreases until the object intensity reaches a preset maximum value, and when the object intensity reaches the preset maximum value, then activating the automatic exposure control until a preset minimum value is reached after which time the automatic projector gain is activated.

In another example embodiment, the subject matter of the first example embodiment can optionally include that the processing unit reconstructs depth using triangulation.

In another example embodiment, the subject matter of the first example embodiment can optionally include that the projector comprises an infrared (IR) projector, the first camera comprises an IR camera, and the second camera comprises a red, green, and blue (RGB) camera.

In a second example embodiment, a method comprises projecting a sequence of light patterns on an object using a projector, capturing a sequence of images of the object illuminated with the projected light patterns using a camera, and controlling depth dynamic range by controlling power of the sequence of light patterns being projected on the object and exposure time of a camera based on information obtained from the sequence of images captured by the camera.

In another example embodiment, the subject matter of the second example embodiment can optionally include that the information comprises intensity information associated with a sequence of images captured by the camera. In another example embodiment, the subject matter of this example embodiment can optionally include that the intensity information comprises an average intensity of a difference between intensity of a sequence of images captured by the camera.

In another example embodiment, the subject matter of the second example embodiment can optionally include that controlling depth dynamic range comprises decreasing the projector laser power if average intensity between a sequence of images captured by the camera is above a first threshold and the camera exposure is set to a preset minimal value and decreasing the exposure of the camera if the average intensity between a sequence of images captured by the camera is above the first threshold and the camera exposure is not set to the preset minimal value.

In another example embodiment, the subject matter of the second example embodiment can optionally include that controlling depth dynamic range comprises increasing the camera exposure of the camera if average intensity between a sequence of images captured by the camera is below a second threshold and the projector power is set to a preset minimal value and decreasing the projector power if average intensity between a sequence of images captured by the camera is below a second threshold and the projector laser power is not set to the present minimal value.

In another example embodiment, the subject matter of the second example embodiment can optionally include that controlling depth dynamic range by controlling power of the sequence of light patterns being projected on the object and exposure time of a camera based on information obtained from the sequence of images captured by the camera comprises performing automatic projector gain and automatic exposure control based on object intensity. In another example embodiment, the subject matter of this example embodiment can optionally include that performing automatic projector gain and automatic exposure control comprises activating automatic projector gain when object intensity associated with the object increases and increasing projector gain as the object intensity decreases until the object intensity reaches a preset maximum value, and when the object intensity reaches the preset maximum value, then activating the automatic exposure control until a preset minimum value is reached after which time the automatic projector gain is activated.

In another example embodiment, the subject matter of the second example embodiment can optionally include that the power of the sequence of light patterns comprises laser power and the projector comprises an infrared (IR) projector.

In a third example embodiment, an article of manufacture has one or more non-transitory computer readable storage media storing instructions which when executed by a system to perform a method comprising: capturing, using a camera, a sequence of images of the object illuminated with projected light patterns on an object using a projector; and controlling depth dynamic range by controlling power of the sequence of light patterns being projected on the object and exposure time of a camera based on information obtained from the sequence of images captured by the camera.

In another example embodiment, the subject matter of the third example embodiment can optionally include that wherein the intensity information comprises an average intensity of a difference between intensity of a sequence of images captured by the camera.

In another example embodiment, the subject matter of the third example embodiment can optionally include that controlling depth dynamic range comprises: decreasing the projector laser power if average intensity between a sequence of images captured by the camera is above a first threshold and the camera exposure is set to a preset minimal value; decreasing the exposure of the camera if the average intensity between a sequence of images captured by the camera is above the first threshold and the camera exposure is not set to the preset minimal value; increasing the camera exposure of the camera if average intensity between a sequence of images captured by the camera is below a second threshold and the projector power is set to a preset minimal value; and decreasing the projector laser power if average intensity between a sequence of images captured by the camera is below a second threshold and the projector power is not set to the preset minimal value.

In another example embodiment, the subject matter of the third example embodiment can optionally include that controlling depth dynamic range by controlling power of the sequence of light patterns being projected on the object and exposure time of a camera based on information obtained from the sequence of images captured by the camera comprises performing automatic laser gain and automatic exposure control based on object intensity.

In another example embodiment, the subject matter of this example embodiment can optionally include that performing automatic projector gain and automatic exposure control comprises activating automatic projector gain when object intensity associated with the object increases and increasing projector gain as the object intensity decreases until the object intensity reaches a preset maximum value, and when the object intensity reaches the preset maximum value, then activating the automatic exposure control until a present minimum value is reached after which time the automatic projector gain is activated.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:
1. An apparatus comprising:
   a projector configured to project a sequence of light patterns on an object;
   a camera configured to capture a sequence of images of the object illuminated with the projected light patterns; and
   a controller coupled to the projector and the camera and operable to receive the sequence of images and perform range control by controlling power of the sequence of light patterns being projected on the object and expo- sure time of the camera based on information obtained from the sequence of images captured by the camera.

2. The apparatus defined in claim 1 wherein the information comprises intensity information associated with the sequence of images captured by the camera.

3. The apparatus defined in claim 2 wherein the intensity information comprises an average intensity determined by averaging intensity values of one image that results from taking a difference between intensity values of images captured by the camera.

4. The apparatus defined in claim 1 wherein the controller is operable to control depth dynamic range by decreasing the projector power if average intensity between the sequence of images captured by the camera is above a first threshold and the camera exposure is set to a preset minimal value and decreasing the exposure of the camera if the average intensity between the sequence of images captured by the camera is above the first threshold and the camera exposure is not set to the preset minimal value.

5. The apparatus defined in claim 4 wherein the controller is operable to control depth dynamic range by increasing the camera exposure of the camera if average intensity between the sequence of images captured by the camera is below a second threshold and the projector power is set to a preset minimal value and increasing the projector power if average intensity between the sequence of images captured by the camera is below the second threshold and the projector power is not set to the present minimal value, wherein the first and second thresholds are not the same.

6. The apparatus defined in claim 1 wherein the controller is operable to control power of the sequence of light patterns being projected on the object and exposure time of the camera based on information obtained from the sequence of images captured by the camera by performing automatic projector gain and automatic exposure control based on object intensity.

7. The apparatus defined in claim 6 wherein performing automatic projector gain and automatic exposure control comprises activating automatic projector gain when object intensity associated with the object increases and increasing projector gain as the object intensity decreases until the object intensity reaches a preset maximum value, and when the object intensity reaches the preset maximum value, then activating the automatic exposure control until a preset minimum value is reached after which time the automatic projector gain is activated.

8. The apparatus defined in claim 1 wherein the controller reconstructs depth using triangulation.

9. The apparatus defined in claim 1 wherein the projector comprises an infrared (IR) projector and the camera comprises an IR camera.

10. A method comprising:
projecting a sequence of light patterns on an object using a projector;
capturing a sequence of images of the object illuminated with the projected light patterns using a camera; and
controlling depth dynamic range by controlling power of the sequence of light patterns being projected on the object and exposure time of the camera based on information obtained from the sequence of images captured by the camera.

11. The method defined in claim 10 wherein the information comprises intensity information associated with the sequence of images captured by the camera.

12. The method defined in claim 11 wherein the intensity information comprises an average intensity determined by averaging intensity values of one image that results from taking a difference between intensity values of images captured by the camera.

13. The method defined in claim 10 wherein controlling depth dynamic range comprises decreasing the projector laser power if average intensity between the sequence of images captured by the camera is above a first threshold and the camera exposure is set to a preset minimal value and decreasing the exposure of the camera if the average intensity between the sequence of images captured by the camera is above the first threshold and the camera exposure is not set to the preset minimal value.

14. The method defined in claim 13 wherein controlling depth dynamic range comprises increasing the camera exposure of the camera if average intensity between the sequence of images captured by the camera is below a second threshold and the projector power is set to a preset minimal value and increasing the projector power if average intensity between the sequence of images captured by the camera is below the second threshold and the projector power is not set to the present minimal value, wherein the first and second thresholds are not the same.

15. The method defined in claim 10 wherein controlling depth dynamic range by controlling power of the sequence of light patterns being projected on the object and exposure time of the camera based on information obtained from the sequence of images captured by the camera comprises performing automatic projector gain and automatic exposure control based on object intensity.

16. The method defined in claim 15 wherein performing automatic projector gain and automatic exposure control comprises activating automatic projector gain when object intensity associated with the object increases and increasing projector gain as the object intensity decreases until the object intensity reaches a preset maximum value, and when the object intensity reaches the preset maximum value, then activating the automatic exposure control until a preset minimum value is reached after which time the automatic projector gain is activated.

17. The method defined in claim 10 wherein the power of the sequence of light patterns comprises laser power and the projector comprises an infrared (IR) projector.

18. An article of manufacture having one or more non-transitory computer readable storage media storing instructions which when executed by a system perform a method comprising:
capturing, using a camera, a sequence of images of an object illuminated with projected light patterns on an object using a projector; and
controlling depth dynamic range by controlling power of the sequence of light patterns being projected on the object and exposure time of the camera based on intensity information obtained from the sequence of images captured by the camera.

19. The article of manufacture defined in claim 18 wherein the intensity information comprises an average intensity determined by averaging intensity values of one image that results from taking a difference between intensity values of images captured by the camera.

20. The article of manufacture defined in claim 18 wherein controlling depth dynamic range comprises:
decreasing the projector laser power if average intensity between the sequence of images captured by the camera is above a first threshold and the exposure of the camera is set to a preset minimal value;
decreasing the exposure of the camera if the average intensity between the sequence of images captured by the camera is above the first threshold and the exposure of the camera is not set to the preset minimal value;

increasing the exposure of the camera if the average intensity between the sequence of images captured by the camera is below a second threshold and the projector laser power is set to a preset maximum value; and increasing the projector laser power if the average intensity between the sequence of images captured by the camera is below the second threshold and the projector laser power is not set to the preset maximum value, wherein the first and second thresholds are not the same.

21. The article of manufacture defined in claim 18 wherein controlling depth dynamic range by controlling power of the sequence of light patterns being projected on the object and exposure time of the camera based on information obtained from the sequence of images captured by the camera comprises performing automatic laser gain and automatic exposure control based on object intensity.

22. The article of manufacture defined in claim 21 wherein performing automatic projector gain and automatic exposure control comprises activating automatic projector gain when object intensity associated with the object increases and increasing projector gain as the object intensity decreases until the object intensity reaches a preset maximum value, and when the object intensity reaches the preset maximum value, then activating the automatic exposure control until a present minimum value is reached after which time the automatic projector gain is activated.

\* \* \* \* \*